(12) United States Patent
Remaker

(10) Patent No.: US 10,057,210 B2
(45) Date of Patent: Aug. 21, 2018

(54) TRANSACTION-BASED NETWORK LAYER ADDRESS ROTATION

(75) Inventor: Phillip A. Remaker, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1053 days.

(21) Appl. No.: 13/102,838

(22) Filed: May 6, 2011

(65) Prior Publication Data

US 2012/0284375 A1 Nov. 8, 2012

(51) Int. Cl.
*G06F 15/177* (2006.01)
*G06F 15/173* (2006.01)
*G06F 15/16* (2006.01)
*H04B 7/216* (2006.01)
*H04W 4/00* (2018.01)
*H04L 29/12* (2006.01)

(52) U.S. Cl.
CPC ...... *H04L 61/2092* (2013.01); *H04L 61/2053* (2013.01)

(58) Field of Classification Search
CPC ....... H04W 8/26; H04W 88/16; H04W 88/06; H04W 12/02; H04L 29/12367; H04L 61/2514
USPC ......................................................... 709/221
See application file for complete search history.

(56) References Cited

U.S. PATENT DOCUMENTS

| | | | |
|---|---|---|---|
| 7,046,666 B1 * | 5/2006 | Bollay et al. | 370/392 |
| 7,672,998 B1 * | 3/2010 | Haskins | H04L 51/12 |
| | | | 709/206 |
| 8,209,354 B1 * | 6/2012 | Shmuylovich et al. | 707/799 |
| 2008/0101315 A1 * | 5/2008 | Bachmutsky | 370/342 |
| 2009/0109940 A1 * | 4/2009 | Vedurmudi | 370/338 |
| 2010/0138546 A1 * | 6/2010 | Dubs | H04L 61/2046 |
| | | | 709/228 |
| 2011/0002261 A1 * | 1/2011 | Mocanu et al. | 370/328 |
| 2011/0179429 A1 * | 7/2011 | Bertin et al. | 719/330 |
| 2012/0236796 A1 * | 9/2012 | Lazaridis et al. | 370/328 |

OTHER PUBLICATIONS

T. Narten et al., "Privacy Extensions for Stateless Address Autoconfiguration in IPv6," The IETF Trust, Sep. 2007: pp. 1-24, <http://tools.ietf.org/html/rfc4941>.

* cited by examiner

*Primary Examiner* — June Sison
*Assistant Examiner* — Kishin G Belani
(74) *Attorney, Agent, or Firm* — Patterson + Sheridan, LLP

(57) ABSTRACT

The present disclosure describes techniques for changing a network layer address (e.g., an IPv6 address) on a transaction or request basis. The change may be in response to an explicit request from an application or in response to detecting that certain predefined events have occurred. For example, the address may be changed each time a network transaction (or n-network transactions) is completed. Doing so could allow an email client to send messages (or groups of message) using distinct network addresses, making it difficult, if not impossible for the sending client to be blocked.

23 Claims, 4 Drawing Sheets

TRANSACTION-BASED NETWORK LAYER ADDRESS ROTATION

TECHNICAL FIELD

Embodiments presented in this disclosure generally relate to computer networking. More specifically, embodiments presented herein provide techniques for changing a host network address (e.g., an IPv6 address) based on application level activity or other specified parameters, without compromising application connectivity.

BACKGROUND

Computer networks have become ubiquitous. One reason for this has been the widespread adoption of interoperable standards that allow computing systems and network infrastructure components from many different vendors to communicate with one another. For example, the TCP/IP standards have been adopted worldwide and are currently the overwhelmingly dominant (and open) standards used for computer networking. Currently, internet protocol version 4 (IPv4) is the protocol used for addressing network packets on the Internet. Traffic originating from a given host (or subnet) can be identified by the source address listed in an IPv4 packet. Because each host (or subnet) typically uses the same address (or range of address), the activity of a given host can be identified using the IP address. Uses of IP address tracking includes so called "black hole" lists, providing a list of hosts (by IP address) believed to be sending email spam, as well as tracking by commercial websites, which allows users' browsing habits to be correlated across multiple visits (or across multiple web sites). At the same time, some mechanisms (e.g., the use of an anonymous proxy server) are used to try and obscure the true IP address used by a given host.

IPv4 was formally adopted as a standard in September 1981 and is showing signs of strain. For example, IPv4 uses a 32-bit address (customarily written using four octets) to uniquely identify each host. This and other constraints of the protocol limit the useable address space of IPv4 to roughly 3.7 billion addresses. This limitation has been recognized for quite some time and techniques have been developed to work around it. For example, NAT (network address translation) allows private subnets to reuse certain specific IP addresses behind a live, routable IP address assigned to a gateway routing device.

While NAT has helped alleviate the issue, IP address space exhaustion remains a significant problem. In fact, ARIN (the American Registry for Internet Numbers) allocated the last unused block of IPv4 addresses in February 2011. Internet protocol version 6 (IPv6) is a version of the internet protocol designed to supplant IPv4. The address space provided by IPv6 is both very abundant and sparsely populated. For example, the IP Version 6 Addressing Architecture (documented in RFC 4291) calls for a minimum allocation of $2^{64}$ addresses for any subnet (i.e., the minimum subnet size in IPv6 is 4.3 million times as large as the entire IPv4 address space). At the same time, a typical IPv6 subnet population tends to be in the dozens to a few thousand distinct hosts. IPv6 provides a 128-bit address space designed to provide roughly $3.4 \times 10^{38}$ unique addresses. This provides an address space large enough to assign many trillions of addresses to every human being on the planet.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1:
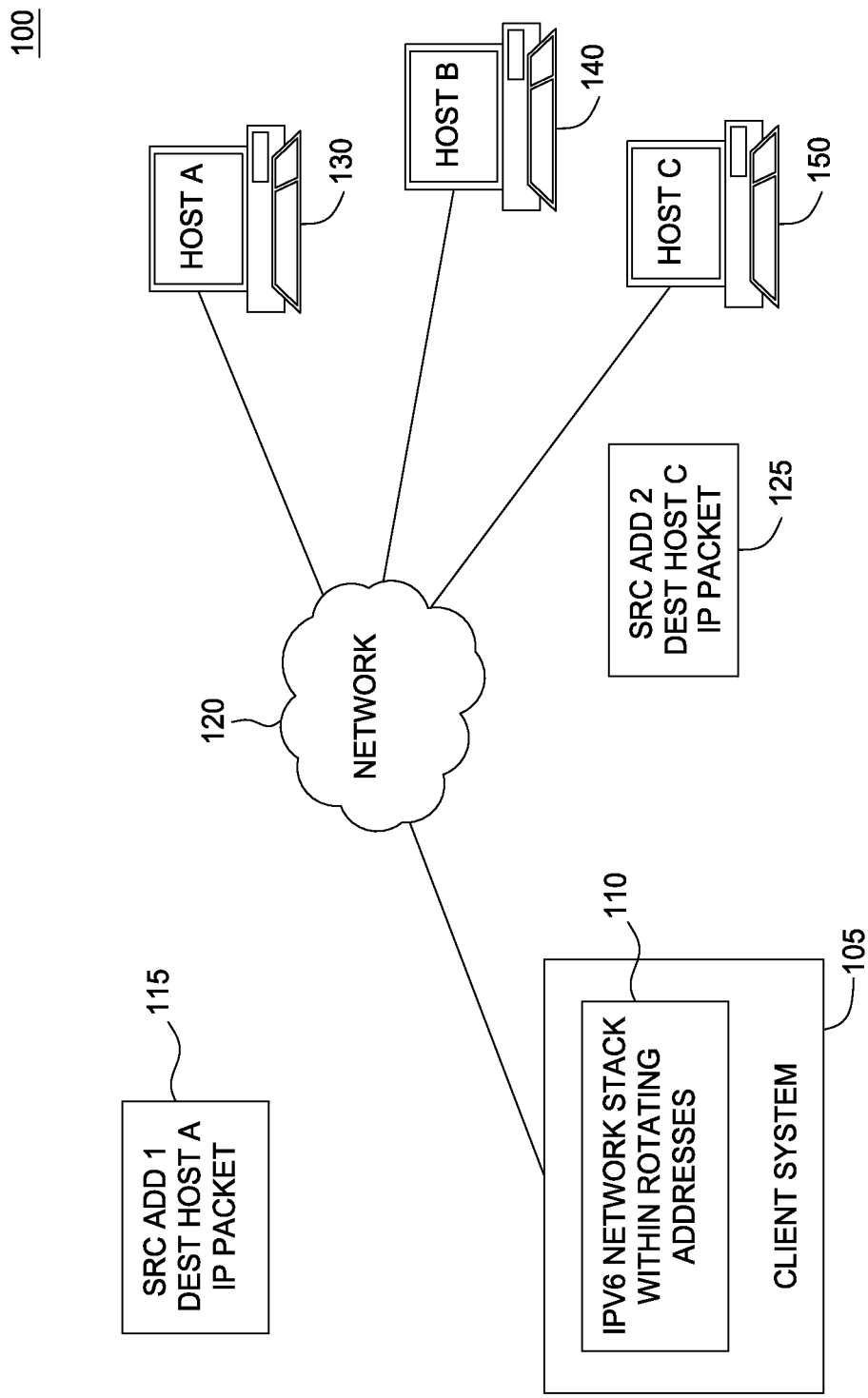
FIG. 1 illustrates an example computing system configured to provide transaction-based network layer address rotation, according to certain embodiments of the present disclosure.

One embodiment described herein includes a computer-implemented method. This method may generally include obtaining a first network address to assign to a network interface on a host computing system, assigning the first network address to the network interface and identifying one or more application layer events for triggering a change to the first network address assigned to the network interface. Upon determining one of the application layer events has occurred, a second network address is obtained and the first network address assigned to the network interface is replaced with the second network address.

Additional embodiments include a computer readable storage medium, storing a program configured to perform the aforementioned method and a system having a processor and a memory storing a program configured to perform the aforementioned method.

Description of Example Embodiments

Embodiments presented herein provide techniques for rotating a network layer address (e.g., an IPv6 address) on a transaction or request basis. Doing so may result in frequent changes to the IPv6 address used by a given host. However, given the overwhelming size of the IPv6 address space (and a minimum subnet size of $2^{64}$ addresses) a host is very unlikely to have either an address collision (where a host uses the same address twice) or exhaust the address pool provided by an IPv6 subnet. Rotating the address a host uses to communicate with a network allows the host to effectively conceal itself from detection or blocking—while simultaneously allowing that host to communicate with entities on the network. For example, frequent IPv6 address changes may allow a user to avoid being tracked in website logs. More specifically, changing the network address for every web (HTTP) transaction prevents a user from being identified by cross correlating activity in the web logs of different web servers.

In one embodiment, a computing system using a TCP/IP network stack may be configured to perform each networking task using a different network address. The computing system can be a commodity desktop or laptop computer, but may also be a virtual machine (VM) running on a server system, appliance, gaming console, mobile telephone or any other device which supports a network communication stack. In a particular embodiment, the TCP/IP network stack uses IPv6 at the network layer. Once the networking task is complete, the network address of the host may be changed. That is, after each transaction (or after n transactions), a new random (or psuedo-random) IPv6 address is assigned to the device to be used for subsequent network communications.

For example, an application level communication event, such as sending an email or conducting some other defined network transaction could be configured to trigger a network address change. In such a case, the application layer may determine, e.g., (i) that the remote-end of a communication channel no longer needs to use the current source address to communicate, (ii) that a new source address may be chosen to continue the current transaction, or (iii) that another transaction is about to be started. In one embodiment, the network layer driver may be configured to determine when to rotate the network address used for a transaction. For example, the network layer driver could be configured to respond to a variety of application layer events (e.g., a request to open a new socket connection to a remote host, a specific period of time having elapsed, or other events). Other application layer events which could be used to trigger a network address change include a new user logging in, a change in physical location or the creation of new database records.

Alternatively (or additionally), the network layer driver could be configured with API hooks that allow an application program (e.g., an email transfer agent (MTA)) to request the address of the host be changed or to request a network address to be used for a specific transaction (e.g., sending a single email message). As another example, a custom IPv6 stack might assign a specific IPv6 source address to a set of transactions happening at a higher layer. For example, email stream 1 may use a source address of A1 and email stream 2 may use a source address of A2, in parallel. In such a case, the messages sent by an MTA handling email stream 1 all have a source address of A1 and an MTA handling email stream 2 all have a source address of A2.

However, once the stream (or transaction) is completed, the MTA may decide to dispose of that source address and pick a new one. In one embodiment, new network addresses can be generated on demand and checked to ensure that no duplicates or overlaps exist using the approach set forth in IETF draft RFC1491. Of course, other approaches for selecting new network addresses may be used. At the same time, each of these examples shows how application level activity may be used to determine the assignment of new IPV6 source addresses, as needed.

Note, the following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purposes of clarity, features relating to technical material that is known in the technical fields related to the proposed ideas have not been described in detail.

FIG. 1 illustrates an example computing system configured to provide transaction-based network layer address rotation, according to certain embodiments of the present disclosure. As shown, the computing infrastructure 100 includes a server computing system 105 and three networked computing systems 130, 140 and 150, each connected to a network 120 (e.g., the Internet).

Computing systems 130, 140 and 150 are included to be representative of any computing device which can send and receive traffic over the network 120. Accordingly, examples of client system 130 include desktop or laptop computers as well as netbooks, tablet devices, game consoles, mobile phones and other handheld devices, among others. Additionally, computing system 105 includes an IPv6 address stack 110 configured to rotate network addresses based on application layer events (or upon application-request). Assume for this example that the computing system 105 is being used to send email messages to computing systems 130, 140 and 150. In particular, computing system 105 is engaging in one transaction with computing system 130 (host A) and another transaction with computing system 150 (host C). For the transaction with host A, one network address is being used, while for the transaction with Host C, another network address is used. Thus, packet 115 is being sent to host A using one network address and an IP packet 125 is being sent to host C using another network address. Further, when the transaction with Host A is complete, if another message is sent to Host A, the network stack 110 may select a different network address for the subsequent message. Similarly, the network stack 110 may assign a different network address for a transaction initiated between computing system 105 and computing system 140 (host B).

Figure 2:
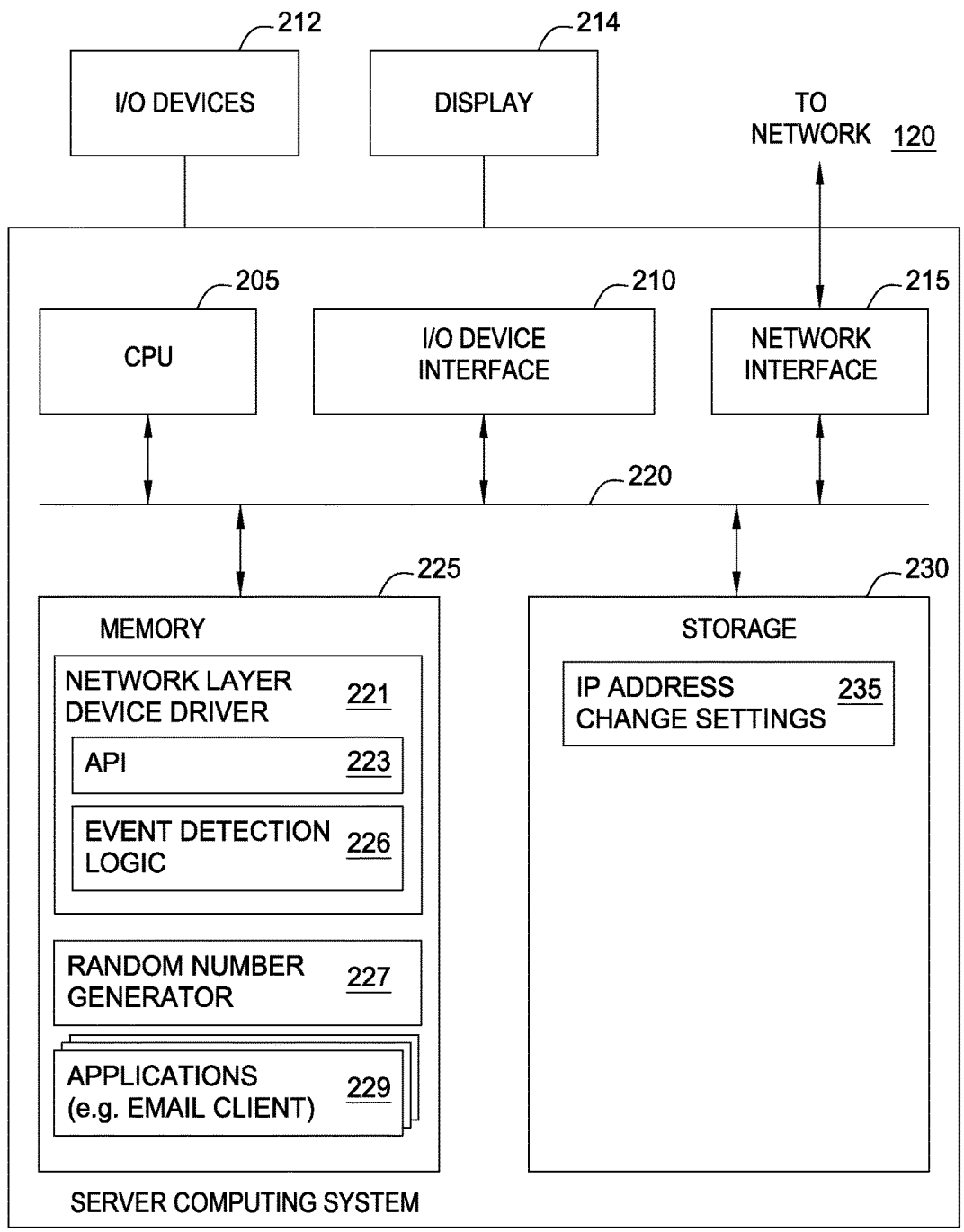
FIG. 2 further illustrates the example computing system shown in FIG. 1, according to certain embodiments of the present disclosure.

FIG. 2 further illustrates the example computing system 105 shown in FIG. 1, according to certain embodiments of the present disclosure. As shown, the computing system 105 includes, without limitation, a central processing unit (CPU) 205, a network interface 215, an interconnect 220, a memory 225 and storage 230. The computing system 105 may also include an I/O device interface 210 connecting I/O devices 212 and a display 214 (e.g., a keyboard, mouse and display screen) to the computing system 105.

The CPU 205 retrieves and executes programming instructions stored in the memory 225. Similarly, the CPU 205 stores and retrieves application data residing in the memory 225. The interconnect 220 facilitates transmission, such as programming instructions and application data, between the CPU 205, I/O devices interface 210, storage 230, network interface 215 and memory 225. CPU 205 is included to be representative of a single CPU, multiple CPUs, a single CPU having multiple processing cores and the like. And the memory 225 is generally included to be representative of a random access memory. The storage 230 may be a disk drive or solid state (SSD) storage drive. The network interface 215 is used by the client system 105 to connect to a network 120.

Illustratively, the memory 225 includes a network layer device driver 221, event detection logic 226, a random (or pseudo-random) number generator 227 and applications 229. The network layer device driver 221 provides a software component configured to support the hardware/chipset used by a specific network interface 215 and to provide network layer services (e.g., IP socket connections) to applications 229. In one embodiment, the network layer device driver 221 may implement the IPv6 standard and use this protocol to route packets towards a destination.

Additionally, the network layer device driver 221 may be configured to change the network address assigned to the network interface 215 in response to a variety of events. For example, the network layer device driver 221 may be configured to assign a new IP address at the initiation (or conclusion) of an application layer transaction, as defined by a particular application 229. That is, a new network address may be assigned for each network transaction performed by one of the applications 229. The particular events or transactions that result in a network address change may be defined as needed for a particular application 229. In one embodiment, the application 229 manages the changing of network addresses assigned to the network interface 215. For example, the API 223 may allow an application to signal the device driver 221 that a transaction is beginning (or concluding) and that the network address should be changed, or an application 228 could signal the device driver 221 that an event has occurred that should result in a change of the network address. In one embodiment, the events that result in a change in network address may be configured and kept in storage 230 as change settings 235.

As another example, the network layer device driver 221 may be configured to assign a new network address when the device driver 221 itself detects that certain events have occurred (as identified by event detection logic 226). For example, the network layer device driver 221 may be configured to assign a new network address for each network socket established by an application 229 or assign a new network address to each network session. The network layer device driver 221 could also assign a new network address in response to external probes such as an ICMP ping message or requests for external connections to ports on the server, or in response to detecting a network based attack. Of course, the events detected by logic 226 which result in a change in network address can be tailored to suit the needs of a particular case. Thus, the network address can be changed when application 229 requests a change, after the completion of every $n^{th}$ transaction, or when some other event is detected (e.g., a specified period of time has elapsed, a time-of-day, or an attempt to connect to the current address).

In one embodiment, the network address assigned to network interface 215 may be assigned randomly using a random (or pseudo-random) number generator 227. Alternatively, new IP addresses could be generated according to a non-random generator. As another alternative, the logic 226 could connect to a network service to obtain a random value used to generate a new IP address (or obtain a new IP address itself). For example, the logic 226 could communicate with a dedicated server in the same IPv6 subnet, where the dedicated server is configured to manage the use of IPv6 addresses within that subnet. Doing so would allow a large collection of hosts to coordinate the use of IPv6 addresses being changed based on application layer events. The device driver 221 may keep track of what network addresses have been used by network interface 215 to avoid address reuse. Further, the addresses which may be randomly assigned may be limited to a range of addresses (specified using change settings 235). Limiting a range of addresses substantially prevents a network address used by another host on the same subnet from being assigned to network interface 215.

In one embodiment, the device driver 221 may be configured to generally assign the same network address to the interface 215 and switch to randomly assigned addresses when engaging in a particular transaction (or class of transactions). Further, the network address may be changed immediately upon a change event being detected. However, as changing an address immediately upon detecting a change event might terminate any uncompleted network transactions, a flag may be set to allow any pending transactions to be completed. In such a case, when a network transaction is completed, the device driver 221 may determine whether the flag is currently set and change the network address as appropriate.

Figure 3:
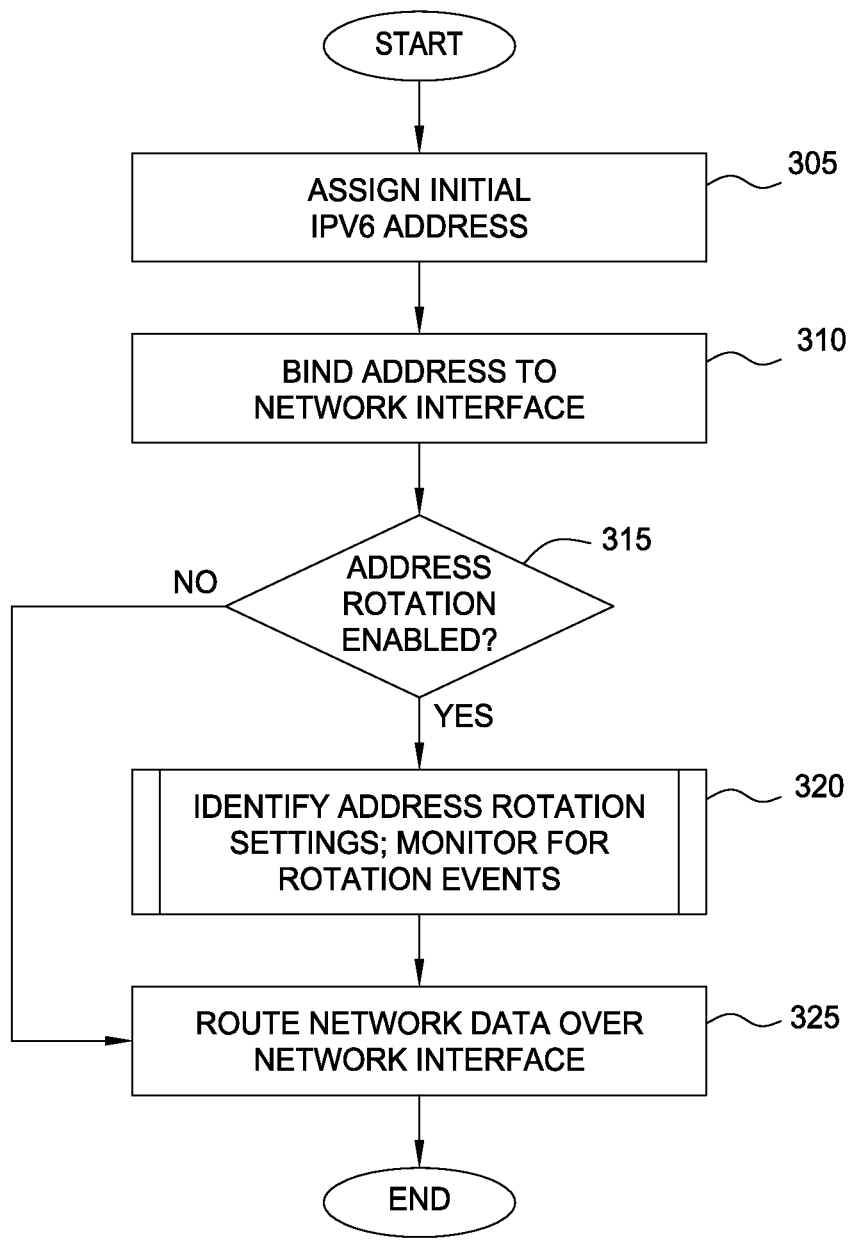
FIG. 3 illustrates a method for managing a transaction-based network address, according to certain embodiments of the present disclosure.

FIG. 3 illustrates a method 300 for managing a transaction-based network address, according to certain embodiments of the present disclosure. As shown, the method 300 begins at step 305 where an initial network address is assigned to a network interface. As noted, in one embodiment, the initial address may be assigned randomly from a selected range of addresses in a subnet. Alternatively, however, the initial IP address may be one used consistently by the host, until a request is received (or an event is detected) to begin using randomly assigned (or rotating) network addresses or to simply change the network address.

At step 310, the network address identified at step 305 is bound to the network interface. That is, the network address is assigned to the physical network interface 215 for use in sending and receiving network traffic. Once bound, the network address is used as a source address for traffic sent from the network interface and a destination address for packets sent to the network interface. At step 315, if network address rotation is not enabled, then the device driver routes network data (step 325) using the network address bound to the network interface at step 310.

At step 315, if network address rotation is enabled, then the device driver may identity the address change settings used for changing the network address (step 320). For example, the device driver may begin monitoring for network transactions, events or requests to change the network address bound to the network interface. At step 325, the device driver routes network data using the network address currently assigned to the network interface.

Figure 4:
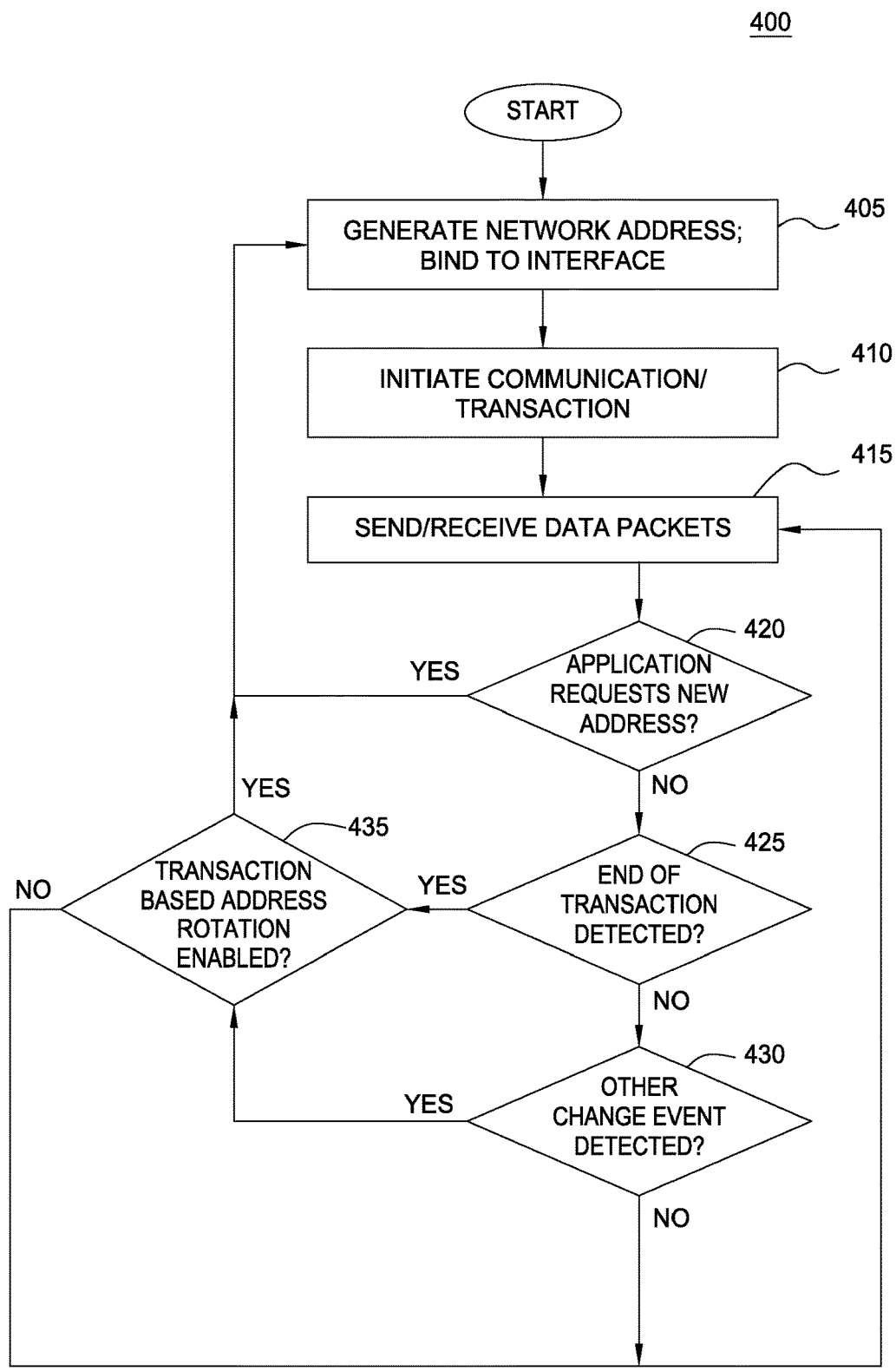
FIG. 4 illustrates a method for an IPv6 network stack to respond to requests to update an IPv6 address and to respond to predefined change events, according to certain embodiments of the present disclosure.

FIG. 4 illustrates a method 400 for a network device driver to respond to requests to update a network address and to respond to predefined address change events, according to certain embodiments of the present disclosure. FIG. 4 illustrates the application of a set of example events monitored at step 320 of the method 300. Method 400 begins at step 405 where a network layer device driver generates a network address and binds it to a network interface. As noted above, in one embodiment, the address may be an IPv6 address selected from a range of addresses within an IPv6 subnet made available to a given host.

At step 410, an application program may initiate a network based transaction. For example, an email client could request to open a network socket to send an email message towards a destination. In such a case, the network packets used to encapsulate the application layer message (i.e., the email message) would include a destination address as well as a source address of the current network layer address bound to the interface. At step 415, the device driver sends network packets using the currently assigned network address (as a source address) and receives network traffic with the assigned network address as a destination address.

At step 420, the device driver determines whether an application has requested a network address be changed. If so, then the method returns to step 405 and generates a new network address to bind to the interface. In one embodiment, the new network address is bound to the interface immediately. Alternatively, however, the device driver may wait for any pending transactions to complete, queues to drain, or outstanding acknowledgements to be received prior to binding a new network address to the interface.

If no explicit request to change the network address has been received, the device driver may determine whether a network address change event has occurred (steps 425 and 430) and whether transaction or event based address rotation is enabled (step 435). At step 425 the device driver may determine whether a network transaction (or n-transactions) has been completed. And at step 430, it is determined whether any other change event has occurred. For example, change events may be related to changing the network address after a specified period of time, changing the network address at a specified time-of-day, or an attempt to connect to the current address. Other examples include a system configured to respond to external messages—such as a portable device moving from one location to another (determined, e.g., using motion sensors or GPS signals), or receiving a radio signal, text message, phone call, or other message. Of course, any of these events individually (or in combination with one other) or other events may used as signal to the device driver to change the network address bound to a network interface. Further, as noted, the address change may take place immediately, or wait for any outstanding network activity to be completed prior to binding the news address to the interface.

As described, embodiments presented herein provide techniques for rotating a network layer address (e.g., an IPv6 address) on a transaction or request basis. The change may be in response to an explicit request from an application. But the network address can also be in response to detecting that certain predefined events have occurred. For example, the address may be changed each time a network transaction (or n-network transactions) is completed. Doing so could allow an email client to send messages (or groups of message) using distinct network addresses, making it difficult, if not impossible for the sending client to be blocked.

Further, frequently changing the network address may prevent users from being identified by cross correlating activity in the web logs of different web servers. At the same time, the expansive address space provided by the $2^{64}$ subnet size in IPv6 makes it overwhelmingly improbable that the address space used by the network interface will be exhausted or that frequently changing the network address will result in any contention or collision problems.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

I claim:

1. A computer-implemented method to prevent network-based transactions with different target computing systems from being correlated as originating from the same host computing system, the computer-implemented method comprising:

identifying one or more network-based transactions performed at an application layer on a host computing system and that satisfy a condition for changing a first internet protocol (IP) address assigned to a network interface, wherein the one or more network-based transactions are associated with a first target computing system and comprise at least one of creating a new socket connection, sending an email message, receiving an IP address change request, and detecting occurrence of a predefined event;

upon determining one of the network-based transactions has been completed, and by operation of one or more computer processors: obtaining a second IP address generated based on a range of IP addresses within a network subnet to which the host computing system is connected, and preventing network-based transactions with different target computing systems from being correlated as originating from the same host computing system, by assigning the second IP address to the network interface, thereby replacing the first IP address with the second IP address, wherein the first IP address is replaced by a network layer device driver operatively connected to a random number generator configured to generate the second IP address, the network layer device driver having event detection logic and an application programming interface providing a predefined function to signal the network layer device driver that a specified network-based transaction is beginning or concluding; and subsequent to assigning the second IP address to the network interface, performing at least one network-based transaction at the application layer on the host computing system, wherein the at least one network-based transaction is associated with a second target computing system different from the first target computing system.

2. The computer-implemented method of claim 1, wherein the first IP address and the second IP address are generated at random.

3. The computer-implemented method of claim 1, wherein the second IP address replaces the first IP address after any pending network-based transactions which depend on the first IP address are completed.

4. The computer-implemented method of claim 1, wherein the first IP address is replaced with the second IP address by request from the application layer of the host computing system, wherein the one or more network-based transactions are performed using the first IP address and not using the second IP address, wherein the at least one network-based transaction is performed using the second IP address and not using the first IP address.

5. The computer-implemented method of claim 4, wherein the network layer device driver is operatively connected to one or more applications including an email client, wherein the second IP address is randomly generated; wherein the application programming interface is configured to provide:

(i) a first predefined function for the one or more applications to signal the network layer device driver that a specified network-based transaction is beginning; and (ii) a second predefined function for the one or more applications to signal the network layer device driver that a specified network-based transaction is concluding;

wherein the predefined function is selected from the first and second predefined functions, wherein each event type satisfies the condition for changing the first IP address, wherein the event detection logic is configured to detect each event type selected from:
(i) detecting that a new network socket is established;
(ii) detecting an external probe comprising a ping message under a specified protocol, the specified protocol comprising internet control message protocol (ICMP);
(iii) detecting a request for an external connection to a specified port on the host computing system; and
(iv) detecting a network-based attack on the host computing system.

6. The computer-implemented method of claim 1, wherein the first IP address is replaced with the second IP address by request from the application layer of the host computing system.

7. The computer-implemented method of claim 1, wherein the one or more network-based transactions are performed using the first IP address and not using the second IP address.

8. The computer-implemented method of claim 1, wherein the at least one network-based transaction is performed using the second IP address and not using the first IP address.

9. The computer-implemented method of claim 1, wherein the application programming interface is configured to provide at least one of:
(i) a first predefined function for one or more applications to signal the network layer device driver that a specified network-based transaction is beginning; and
(ii) a second predefined function for one or more applications to signal the network layer device driver that a specified network-based transaction is concluding.

10. A non-transitory computer-readable medium storing program code executable to perform an operation to prevent network-based transactions with different target computing systems from being correlated as originating from the same host computing system, the operation comprising:
identifying one or more network-based transactions performed at an application layer on a host computing system and that satisfy a condition for changing a first internet protocol (IP) address assigned to a network interface, wherein the one or more network-based transactions are associated with a first target computing system and comprise at least one of creating a new socket connection, sending an email message, receiving an IP address change request, and detecting occurrence of a predefined event;
upon determining one of the network-based transactions has been completed, and by operation of one or more computer processors when executing the program code: obtaining a second IP address generated based on a range of IP addresses within a network subnet to which the host computing system is connected, and preventing network-based transactions with different target computing systems from being correlated as originating from the same host computing system, by assigning the second IP address to the network interface, thereby replacing the first IP address with the second IP address, wherein the first IP address is replaced by a network layer device driver operatively connected to a random number generator configured to generate the second IP address, the network layer device driver having event detection logic and an application programming interface providing a predefined function to signal the network layer device driver that a specified network-based transaction is beginning or concluding; and
subsequent to assigning the second IP address to the network interface, performing at least one network-based transaction at the application layer on the host computing system, wherein the at least one network-based transaction is associated with a second target computing system different from the first target computing system.

11. The non-transitory computer-readable medium of claim 10, wherein the first IP address and the second IP address are generated at random.

12. The non-transitory computer-readable medium of claim 10, wherein the second IP address replaces the first IP address after any pending network-based transactions which depend on the first IP address are completed.

13. The non-transitory computer-readable medium of claim 10, wherein the first IP address is replaced with the second IP address by request from the application layer of the host computing system.

14. The non-transitory computer-readable medium of claim 10, wherein the one or more network-based transactions are performed using the first IP address and not using the second IP address.

15. The non-transitory computer-readable medium of claim 10, wherein the at least one network-based transaction is performed using the second IP address and not using the first IP address.

16. The non-transitory computer-readable medium of claim 10, wherein the application programming interface is configured to provide at least one of:
(i) a first predefined function for one or more applications to signal the network layer device driver that a specified network-based transaction is beginning; and
(ii) a second predefined function for one or more applications to signal the network layer device driver that a specified network-based transaction is concluding.

17. A host computing system to prevent network-based transactions with different target computing systems from being correlated as originating from the same host computing system, the computing system comprising:
one or more computer processors; and
a memory storing a network device driver which, when executed by the one or more computer processors, performs an operation comprising:
identifying one or more network-based transactions performed at an application layer on the host computing system and that satisfy a condition for changing a first internet protocol (IP)address assigned to a network interface, wherein the one or more network-based transactions are associated with a first target computing system and comprise at least one of creating a new socket connection, sending an email message, receiving an IP address change request, and detecting occurrence of a predefined event;
upon determining one of the network-based transactions has been completed: obtaining a second IP address generated based on a range of IP addresses within a network subnet to which the host computing system is connected, and preventing network-based transactions with different target computing systems from being correlated as originating from the same host computing system, by assigning the second IP address to the network interface, thereby replacing the first IP address with the second IP address, wherein the first IP address is replaced by a network layer device driver operatively connected to a random number generator configured to generate the second IP address, the network layer device driver having event detection logic and an application programming interface providing a predefined function to signal the network layer device driver that a specified network-based transaction is beginning or concluding; and subsequent to assigning the second IP address to the network interface, performing at least one network-based transaction at the application layer on the host computing system, wherein the at least one network-based transaction is associated with a second target computing system different from the first target computing system.

18. The host computing system of claim 17, wherein the first IP address and the second IP address are generated at random.

19. The host computing system of claim 17, wherein the second IP address replaces the first IP address after any pending network-based transactions which depend on the first IP address are completed.

20. The host computing system of claim 17, wherein the first IP address is replaced with the second IP address by request from the application layer of the host computing system.

21. The host computing system of claim 17, wherein the one or more network-based transactions are performed using the first IP address and not using the second IP address.

22. The host computing system of claim 17, wherein the at least one network-based transaction is performed using the second IP address and not using the first IP address.

23. The host computing system of claim 17, wherein the application programming interface is configured to provide at least one of:
 (i) a first predefined function for one or more applications to signal the network layer device driver that a specified network-based transaction is beginning; and
 (ii) a second predefined function for one or more applications to signal the network layer device driver that a specified network-based transaction is concluding.

* * * * *